US008189518B2

(12) United States Patent
Imamura et al.

(10) Patent No.: US 8,189,518 B2
(45) Date of Patent: May 29, 2012

(54) SYSTEMS AND METHODS FOR USING A FORMAT OF AN UPLINK CONTROL CHANNEL TO TRANSMIT A CHANNEL QUALITY INDICATOR

(75) Inventors: Kimihiko Imamura, Vancouver, WA (US); Shugong Xu, Vancouver, WA (US); Huaming Wu, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 869 days.

(21) Appl. No.: 11/876,412

(22) Filed: Oct. 22, 2007

(65) Prior Publication Data

US 2009/0103482 A1 Apr. 23, 2009

(51) Int. Cl.
*H04W 4/00* (2009.01)
(52) U.S. Cl. ........................................ 370/329
(58) Field of Classification Search .................. 370/229, 370/230, 329, 310, 332, 341, 389, 431, 465
See application file for complete search history.

(56) References Cited

U.S. PATENT DOCUMENTS

| 7,961,700 B2 * | 6/2011 | Malladi et al. ................. 370/345 |
| 2008/0080423 A1 * | 4/2008 | Kolding et al. ................ 370/329 |
| 2008/0232449 A1 * | 9/2008 | Khan et al. ..................... 375/220 |
| 2008/0311919 A1 * | 12/2008 | Whinnett et al. ............. 455/447 |

FOREIGN PATENT DOCUMENTS

WO 2007065272 6/2007

OTHER PUBLICATIONS

NTT DoCoMo, Fujitsu, KDDI, Mitsubishi Electric, Sharp, "CDMA-Based Multiplexing Method for Multiple ACK/NACK and CQI in E-UTRA Uplink," R1-070862, Feb. 2007.

Motorola, "Multiplexing of UL L1/L2 Control Signals in the Absence of Data," R1-071428, Mar. 2007.
NEC Group, "Multiplexing of Uplink Data-non-Associated Control Signal without Data," R1-071503, Mar. 2007.
Samsung, "Uplink Data-non-associated Control Signaling," R1-071573, Mar. 2007.
Nokia, "Uplink Scheduling for VoIP," R2-070476, Feb. 2007.
3GPP TS 36.212 V8.0.0, "Multiplexing and Channel Coding (Release 8)," Sep. 2007.
R1-073314, "MCS Selection for LTE," 3GPP RAN WG1 #50, Athens, Greece, Aug. 2007.
R2-071292, "Scheduling optimizations—way forward," 3GPP RAN WG2 #57bis, Malta, Mar. 2007.
R1-072590, Proposed way forward for CQI Feedback Control and Content in E-UTRA, 3GPP RAN WG1 #50, Athens, Greece, Aug. 2007.
3GPP TS 36.211 V1.1.0, "Physical Channels and Modulation (Release 8)," May 2007.
R1-073618, "Usage of Cyclic Shifts and block-wise spreading codes for Uplink ACK/NACK," 3GPP RAN WG1 #50, Athens, Greece, Aug. 2007.
R1-073705, "Persistent Scheduling in E-UTRA," 3GPP RAN WG1 #50, Athens, Greece, Aug. 2007.
R1-074287, "Multiplexing Schemes for UL Control Signals," 3GPP RAN WG1 #50bis, Shanghai, China, Oct. 2007.
R1-072438, "CDMA-Based Control Signaling Multiplexing in E-UTRA Uplink," 3GPP RAN WG1 #49, Kobe, Japan, May 2007.

* cited by examiner

*Primary Examiner* — Kwang B Yao
*Assistant Examiner* — Anh Ngoc Nguyen
(74) *Attorney, Agent, or Firm* — Austin Rapp & Hardman (57) ABSTRACT

A method for using a format of an uplink control channel to transmit a channel quality indicator (CQI) is described. The uplink control channel is provided in a first format. The uplink control channel in the first format carries either the CQI or acknowledgment/non-acknowledgment (ACK/NAK) information. The CQI or the ACK/NAK information is inserted into the uplink control channel. Either the CQI or the ACK/NAK information is transmitted through uplink control channel.

15 Claims, 10 Drawing Sheets

SYSTEMS AND METHODS FOR USING A FORMAT OF AN UPLINK CONTROL CHANNEL TO TRANSMIT A CHANNEL QUALITY INDICATOR

TECHNICAL FIELD

The present disclosure relates generally to communications and wireless communications systems. More specifically, the present disclosure relates to systems and methods for using a format of an uplink control channel to transmit a channel quality indicator.

BACKGROUND

The 3rd Generation Partnership Project, also referred to as "3GPP," is a collaboration agreement that aims to define globally applicable Technical Specifications and Technical Reports for 3rd Generation Systems. 3GPP Long Term Evolution (LTE) is the name given to a project to improve the Universal Mobile Telecommunications System (UMTS) mobile phone or device standard to cope with future requirements. The 3GPP may define specifications for the next generation mobile networks, systems, and devices. In one aspect, UMTS has been modified to provide support and specification for the Evolved Universal Terrestrial Radio Access (E-UTRA) and Evolved Universal Terrestrial Radio Access Network (E-UTRAN). In 3GPP LTE (E-UTRA and E-UTRAN) terminology, a base station is called an "evolved NodeB" (eNB) and a mobile terminal or device is called a "user equipment" (UE).

In 3GPP LTE, the eNB regularly transmits a downlink reference symbol (DLRS) that is used by the UEs for channel measurement, such as signal-to-interference ratio (SINR), which may be represented by a channel quality indicator (CQI). Each UE regularly transmits CQIs back to the eNB to enable the eNB to perform resource scheduling. Resource scheduling means the eNB allocates the modulation schemes, coding rates and subcarrier frequencies to optimize the downlink and uplink transmissions for each UE.

The data transmitted over a wireless network may be categorized as either non-real-time (NRT) data or real-time (RT) data. Examples of NRT data include data transmitted during web browsing by a UE or text-messaging to a UE, while an example of RT data is voice communication between UEs. The typical manner of resource scheduling for NRT data is dynamic scheduling by the eNB to each UE at each transmission time interval (TTI). During dynamic scheduling, the UE regularly transmits CQIs back to the eNB.

However, in 3GPP LTE the UEs are also required to transmit and receive RT data, specifically voice data which may be carried as Voice over Internet Protocol (VoIP) transmissions. A typical VoIP session has periodic small data packets at fixed intervals and periodic silence indication (SID) packets at fixed intervals. Unlike NRT data transmission, VoIP transmission is handled using persistent scheduling. In contrast to dynamic scheduling, in persistent scheduling when a UE's downlink reception is enabled, if the UE cannot find its resource allocation, a downlink transmission according to a predefined resource allocation is assumed.

VoIP transmission and its associated persistent method of resource allocation present special issues regarding the transmission of CQIs by the UEs through an uplink control channel. As such, benefits may be realized by providing systems and methods for using an existing format of an uplink control channel to transmit CQIs.

DETAILED DESCRIPTION

A method for using a format of an uplink control channel to transmit a channel quality indicator (CQI) is described. The uplink control channel is provided in a first format. The uplink control channel in the first format carries either the CQI or acknowledgment/non-acknowledgment (ACK/NAK) information. The CQI or the ACK/NAK information is inserted into the uplink control channel. Either the CQI or the ACK/NAK information is transmitted through uplink control channel.

The uplink control channel may be a Physical Uplink Control Channel (PUCCH). The uplink control channel may be a Physical Uplink Shared Control Channel (PUSCH). The uplink control channel in the first format may carry two bits of information. In one embodiment, the CQI comprises two bits.

Resource allocations for the uplink control channel may be received. The method may be implemented by mobile user equipment (UE), wherein the UE is a persistent scheduled UE. The uplink control channel may be provided in a second format for the CQI if the UE is a dynamically scheduled UE.

A method for determining the type of information being carried in an uplink control channel is also described. A scheduling type for a user equipment (UE) is determined. An information type is determined. A format type for the uplink control channel is determined. Resources for the uplink control channel are reserved. The uplink control channel is received in a first format that includes a CQI or ACK/NAK information. A modulation and coding scheme (MCS) is allocated if the CQI is received. Hybrid Automatic Repeat Request (HARQ) is implemented if ACK/NAK information is received.

The format type for the uplink control channel may carry two bits of information, if the determined scheduling type for the UE is a persistent scheduling and if the determined information type is the CQI. A first set of resources for the CQI and the ACK/NAK information may be reserved for a persistent scheduled UE. A second set of resources for the ACK/NAK information may be reserved for a dynamic scheduled UE. The first set of resources and the second set of resources may be reserved separately. The CQI and the ACK/NAK information may be allocated into different subframes.

A communications device that is configured to use a format of an uplink control channel to transmit a channel quality indicator (CQI) is also described. The communications device includes a processor and memory in electronic communication with the processor. Instructions are stored in the memory. The uplink control channel is provided in a first format. The uplink control channel in the first format carries either the CQI or acknowledgment/non-acknowledgment (ACK/NAK) information. The CQI or the ACK/NAK information is inserted into the uplink control channel. Either the CQI or the ACK/NAK information is transmitted through uplink control channel.

A base station that is configured to determine the type of information being carried in an uplink control channel is also described. The base station includes a processor and memory in electronic communication with the processor. Instructions are stored in the memory. A scheduling type for a user equipment (UE) is determined. An information type is determined. A format type for the uplink control channel is determined. Resources for the uplink control channel are reserved. The uplink control channel is received in a first format that includes a CQI or ACK/NAK information. A modulation and coding scheme (MCS) is allocated if the CQI is received. Hybrid Automatic Repeat Request (HARQ) is implemented if ACK/NAK information is received.

A computer-readable medium including executable instructions is also described. An uplink control channel is provided in a first format. The uplink control channel in the first format carries either a channel quality indicator (CQI) or acknowledgment/non-acknowledgment (ACK/NAK) information. The CQI or the ACK/NAK information is inserted into the uplink control channel. Either the CQI or the ACK/NAK information is transmitted through uplink control channel.

Several exemplary embodiments are now described with reference to the Figures. This detailed description of several exemplary embodiments, as illustrated in the Figures, is not intended to limit the scope of the claims.

The word "exemplary" is used exclusively herein to mean "serving as an example, instance or illustration." Any embodiment described as "exemplary" is not necessarily to be construed as preferred or advantageous over other embodiments.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments," unless expressly specified otherwise.

The term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The Third Generation Partnership Project (3GPP) includes a project known as Long Term Evolution (LTE) which strives to improve the Universal Mobile Telecommunication System (UMTS) mobile phone standard to cope with future requirements. Systems implementing these LTE improvements (hereafter, "LTE systems") may experience improved efficiency, lower costs, improved services, new spectrum opportunities, improved integration with other standards, etc. Communication applications, such as Voice over Internet Protocol (VoIP) may be implemented in LTE systems.

LTE systems include the concepts of dynamic scheduling and persistent scheduling. Dynamic scheduling implies that a piece of mobile user equipment (UE) sends a resource request for every packet (such as a VoIP packet) that is to be received or transmitted by the UE. A UE may be a mobile device, mobile station, mobile communications device, access terminal, etc. An evolved NodeB (eNB) may allocate uplink resources for every packet and every retransmission separately during dynamic scheduling. The eNB may be a base station, access point, etc. One drawback of dynamic scheduling is the large amount of signaling. For example, in dynamic scheduling, almost 30 levels of modulation and coding schemes (MCS) may be considered for each resource request. In one embodiment, "uplink" (UL) refers to communications from the UE to the eNB and "downlink" (DL) refers to communications from the eNB to the UE.

In order to reduce the amount of signaling, persistent scheduling may be used. In persistent scheduling, a sequence of resources as well as a fixed MCS may be allocated to the UE at the beginning of an active period or inactive period. In one embodiment, an active period signifies the time the UE is transmitting voice packets, and the inactive period represents the time the UE is receiving silence identification (SID) packets. The allocation of resources and the MCS may be valid until the UE receives another allocation which may then override the previous allocation. In persistent scheduling, four levels of MCS may be considered (as opposed to 30 levels of MCS in dynamic scheduling).

The allocation of the MCS may be decided by the eNB depending on a Channel Quality Indicator (CQI) value that is sent from the UE. The CQI may be used for carrier to interference (C/I) feedback of a DL channel. The CQI may be transmitted to the eNB through a dedicated UL control channel, such as a Physical Uplink Control Channel (PUCCH). In previous systems the set of bits for the CQI is fixed in both the dynamic scheduling mode and the persistent scheduling mode.

Proposals have been made to change the number of CQI bits depending on the scheduling mode (i.e., the persistent scheduling mode or the dynamic scheduling mode). For example, the number of bits for the CQI may be reduced for persistent scheduled VoIP traffic. Specifically, the number of bits may be reduced for VoIP DL talkspurt traffic. Talkspurt traffic may indicate the UE is in an active state and is receiving or transmitting voice packets. During a DL silence period, SID packets may be received by the UE and no CQI information is transmitted. In one embodiment, the number of CQI bits for persistent scheduled VoIP DL talkspurt traffic is reduced to two. As previously stated, four levels of MCS may be considered in persistent scheduling mode. As such, reducing the number of CQI bits to two may be sufficient for persistent scheduling of resources for UEs.

Currently, three format types exist for a UL control channel that is used to carry the CQI information and the ACK/NAK information from the UE to the eNB. In one embodiment, the UL control channel is a PUCCH. A first format (hereinafter, "format 0") and a second format (hereinafter, "format 1") are currently used to carry ACK/NAK information. A third format (hereinafter, "format 2") may be used to carry CQI information and ACK/NAK information. Format 0 may indicate that one bit is carried on the PUCCH. Format 1 may indicate that two bits are carried on the PUCCH. Format 2 may indicate that 10 bits are carried on the PUCCH to the eNB. Since the number of bits for CQI information may be reduced in persistent scheduled VoIP DL talkspurt traffic, resources may be wasted if format 2 of the PUCCH is used to carry the CQI information. In addition, the introduction of a new format type for a PUCCH to transmit the reduced CQI information for VoIP may introduce several layers of complexity. As such, the present systems and methods utilize existing PUCCH format types to carry VoIP CQI information in LTE systems.

Figure 1:
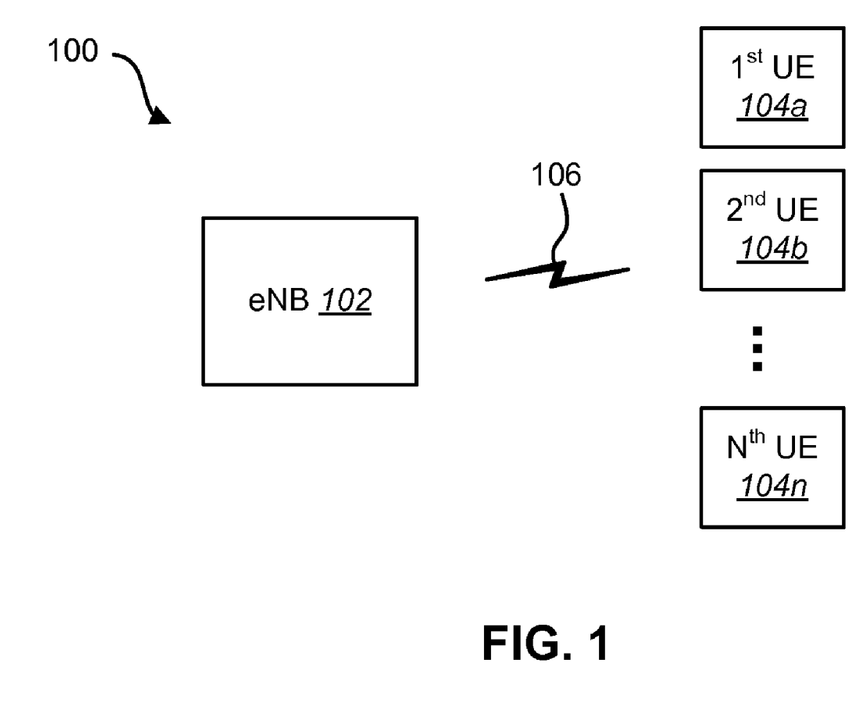
FIG. 1 illustrates an exemplary wireless communication system in which embodiments may be practiced.

FIG. 1 illustrates an exemplary wireless communication system 100 in which embodiments may be practiced. An Evolved NodeB (eNB) 102 is in wireless communication with one or more pieces of mobile user equipment (UE) 104 (which may also be referred to as mobile stations, user devices, communications devices, subscriber units, access terminals, terminals, etc.). The eNB 102 may also be referred to as a base station. The eNB 102 may be a unit adapted to transmit to and receive data from cells. In one embodiment, the eNB 102 handles the actual communication across a radio interface, covering a specific geographical area, also referred to as a cell. Depending on sectoring, one or more cells may be served by the eNB 102, and accordingly the eNB 102 may support one or more mobile UEs 104 depending on where the UEs are located. In one embodiment, the eNB 102 provides a Long Term Evolution (LTE) air interface and performs radio resource management for the communication system 100.

A first UE 104a, a second UE 104b, and an Nth UE 104n are shown in FIG. 1. The eNB 102 transmits data to the UEs 104 over a radio frequency (RF) communication channel 106. The transmitted data may include a plurality of LTE frames. Each of the LTE radio frames may have a length of 10 ms.

Figure 2:
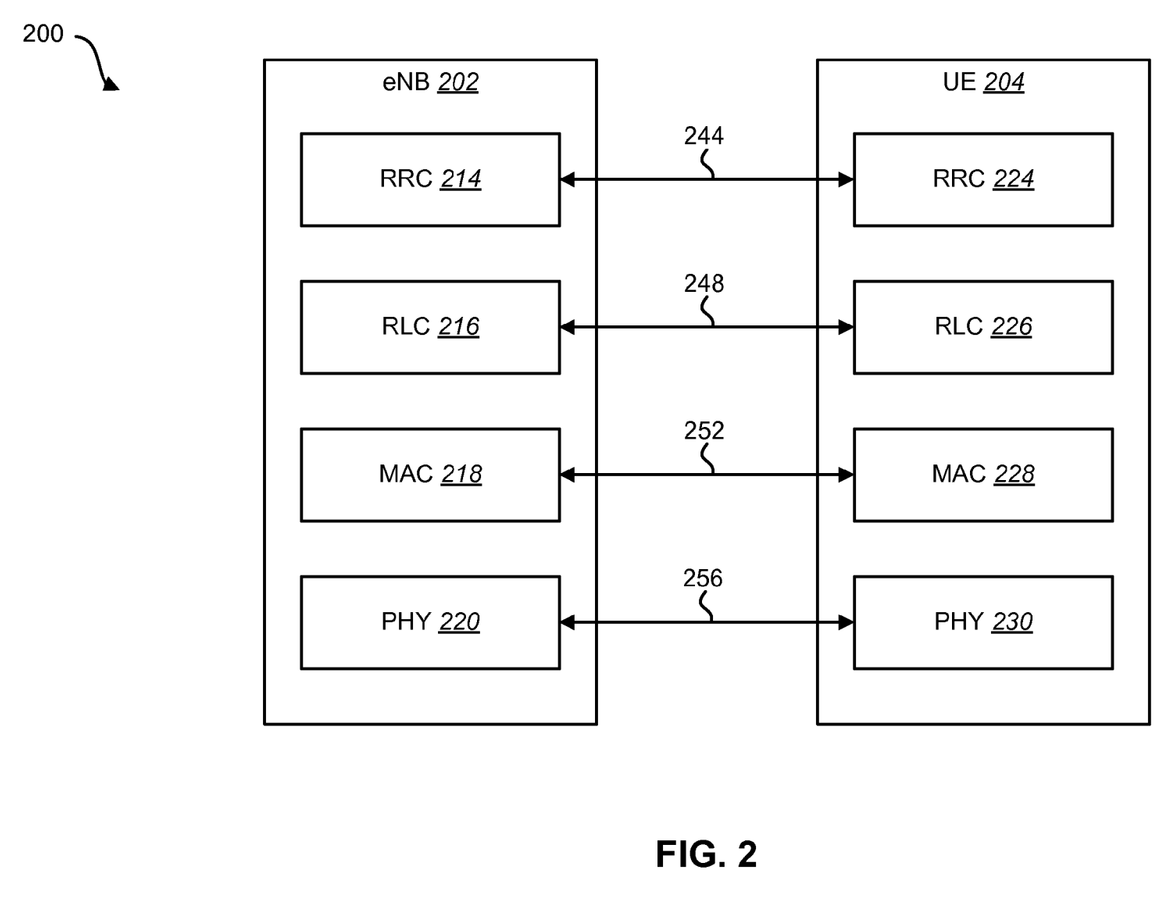
FIG. 2 is a high-level block diagram of exemplary control protocol stacks of a base station, such as an evolved NodeB (eNB), and a user equipment (UE)

FIG. 2 is an exemplary diagram 200 of a portion of the protocol stacks for the control plane of a UE 204 and an eNB 202. The exemplary protocol stacks provide radio interface architecture between the eNB 202 and the UE 204. In one embodiment, the control plane includes a Layer 1 stack that includes a physical (PHY) layer 220, 230, a Layer 2 stack that includes a medium access control (MAC) layer 218, 228, and a Radio Link Control (RLC) layer 216, 226, and a Layer 3 stack that includes a Radio Resource Control (RRC) layer 214, 224.

The RRC layer 214, 224 is generally a Layer 3 radio interface adapted to provide an information transfer service to the non-access stratum. The RRC layer 214, 224 of the present systems and methods may transfer Channel Quality Indicator (CQI) information and Acknowledgement/Non-Acknowledgment (ACK/NAK) information from the UE 204 to the eNB 202. The RRC layer 214, 224 may also provide RRC connection management.

The RLC layer 216, 226 is a Layer 2 radio interface adapted to provide transparent, unacknowledged, and acknowledged data transfer service. The MAC layer 218, 228 is a radio interface layer providing unacknowledged data transfer service on the logical channels and access to transport channels. The MAC layer 218, 228 may be adapted to provide mappings between logical channels and transport channels.

The PHY layer 220, 230 generally provides information transfer services to the MAC layer 218, 228 and other higher layers 216, 214, 226, 224. Typically the PHY layer 220, 230 transport services are described by their manner of transport. Furthermore, the PHY layer 220, 230 may be adapted to provide multiple control channels. In one embodiment, the UE 204 is adapted to monitor this set of control channels. Furthermore, as shown, each layer communicates with its compatible layer 244, 248, 252, 256.

Figure 3:
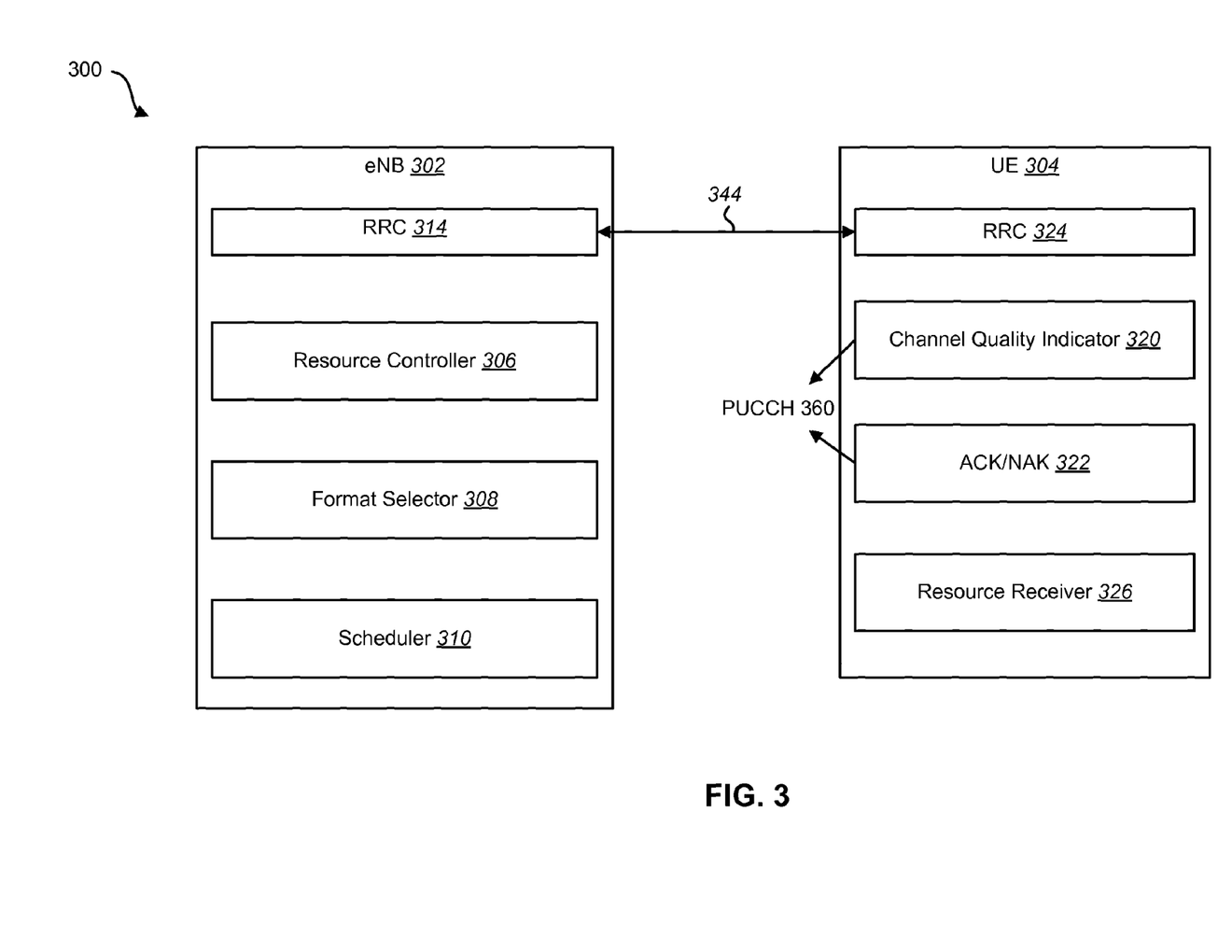
FIG. 3 is a block diagram of one embodiment of the eNB and the UE.

FIG. 3 is a block diagram 300 illustrating one embodiment of the eNB 302 and the UE 304. The eNB 302 may include a resource controller 306 that allocates resources to the UE 304. The UE 304 may utilize these resources to send information to and receive information from the eNB 302. In one embodiment, the resource controller 306 allocates resources for a Physical Downlink Shared Channel (PDSCH) and a Physical Uplink Shared Channel (PUSCH). In addition, the resource controller 306 may allocate resources for a Physical Hybrid Automatic Request Indicator Channel (PHICH). The PHICH may be utilized to carry ACK/NAK information on a downlink (i.e., from the eNB 302 to the UE 304). Further, the controller 306 may also allocate resources for a Physical Uplink Control Channel (PUCCH) 360. The PUCCH 360 may be utilized to carry ACK/NAK information 322 and CQI information 320 from the UE 304 to the eNB 344 on an uplink.

In one embodiment, the allocation of resources for the PUCCH 360 may include information regarding the time and frequency associated with the PUCCH 360. The allocation of the PUCCH 360 may also include information regarding a UE index, which will be further discussed below. Further, the allocation of the PUCCH 360 may indicate to the UE 304 which format of the PUCCH 360 is to be utilized. A format selector 308 may be used to select the format type of the PUCCH 360. In one embodiment, the PUCCH 360 includes three format types (e.g., format 0, format 1 and format 2). Details regarding these different format types will be discussed below.

The eNB 302 may also include a scheduler 310 that schedules information received from the UE 304 into one or more subframes of the LTE radio frames. In one embodiment, the scheduler 310 allocates different subframes for CQI information 320 and ACK/NAK information 322 received from the UE 304.

The UE 304 may include a resource receiver 326 that receives the allotment of resources from the eNB 302. The receiver 326 also determines the format type of the PUCCH 360. Based upon the determined format type, the UE 304 transmits CQI information 320 or ACK/NAK information 322 on the PUCCH 360. The UE 304 includes the RRC layer 324 and may communicate with the eNB 302 through RRC signaling 344 with the corresponding RRC layer 314 of the eNB 302.

Figure 4:
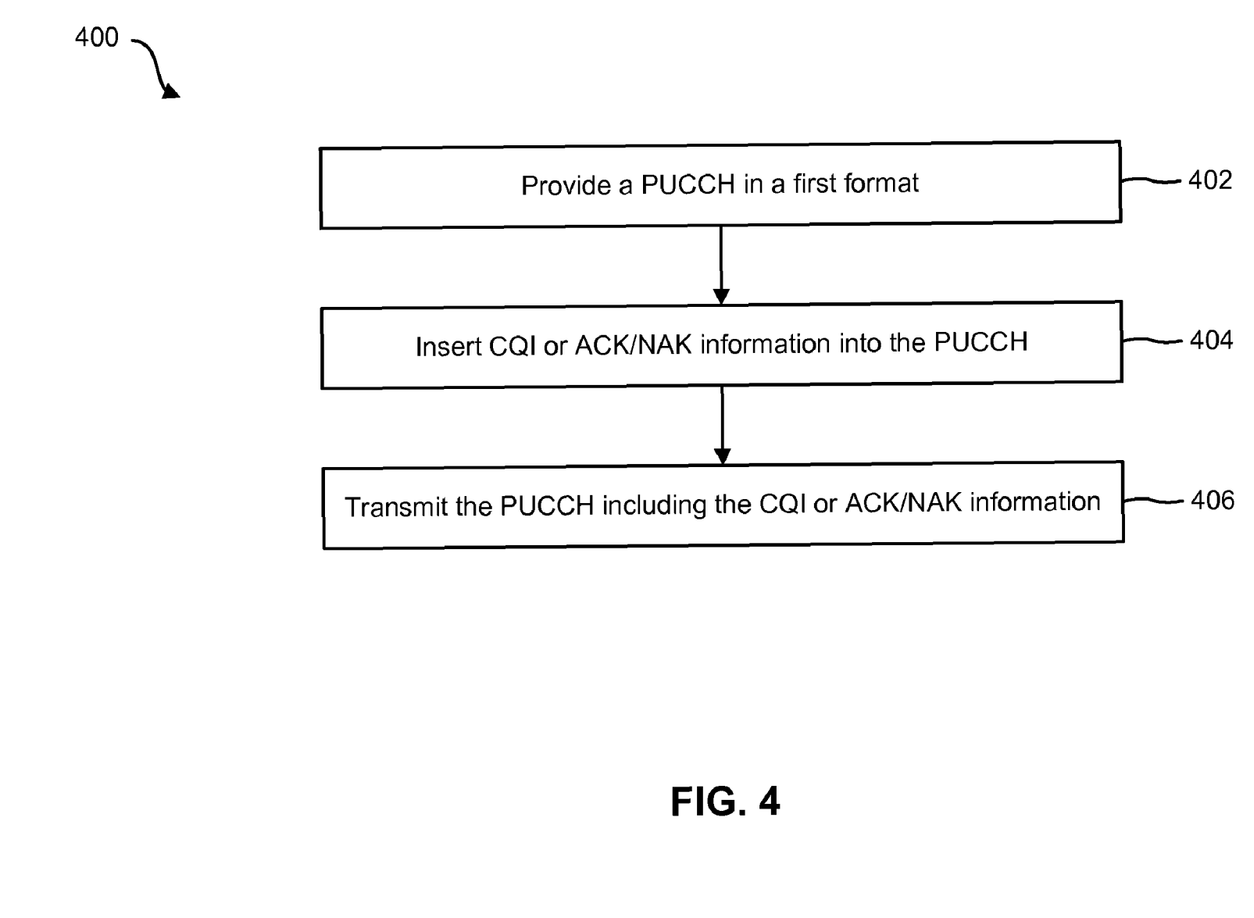
FIG. 4 is a flow diagram illustrating one embodiment of a method for using a format of an uplink (UL) control channel to transmit an indicator that indicates the quality of a downlink (DL) channel.

FIG. 4 is a flow diagram illustrating one embodiment of a method 400 for using a format of an uplink (UL) control channel to transmit an indicator that indicates the quality of a downlink (DL) channel. The method 400 may be implemented by the UE 304. The channel may be a PUCCH 360 and the indicator may be CQI information 320. A PUCCH 360 may be provided 402 in a first format. The format of the PUCCH 360 may be communicated to the UE 304 from the eNB 302. For example, the format selector 308 in the eNB 302 determines the format of the PUCCH 360 that is to be used by the UE 304. In one embodiment, the first format allows up to two bits to be carried by the channel. In other words, the first format of the PUCCH 360 allows for two bits to be transmitted to the eNB 302. In one embodiment, the format selector 308 determines that the format of the PUCCH 360 should be format 1 if persistent scheduling is being implemented.

CQI information 320 or ACK/NAK information 322 may be inserted 404 into the PUCCH 360. The CQI information 320 may indicate to the eNB 302 the quality of the PUCCH 360 being utilized by the UE 304. The ACK/NAK information 322 may indicate to the eNB 302 whether or not a packet was correctly received by the UE 304. In one embodiment, the packet is a voice packet used in VoIP systems. In another embodiment, the packet is a data packet. The PUCCH 360 that includes either the CQI information 320 or the ACK/NAK information 322 is transmitted 406 to the eNB 302.

Figure 5:
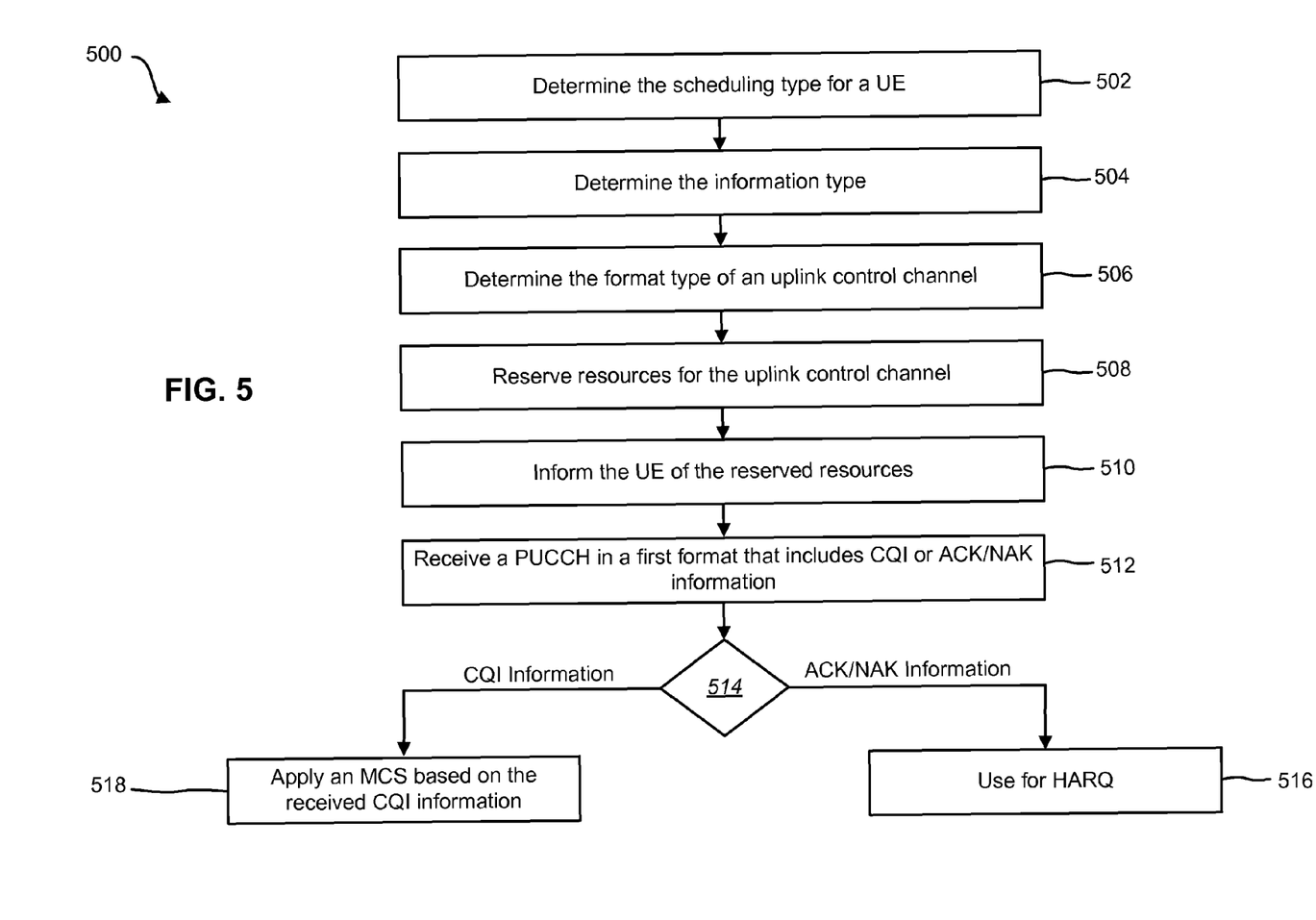
FIG. 5 is a flow diagram illustrating one embodiment of a method for determining whether channel quality indicator (CQI) information or acknowledgment/non-acknowledgment (ACK/NAK) information is being carried by the UL control channel.

FIG. 5 is a flow diagram illustrating one embodiment of a method 500 for determining whether CQI information or ACK/NAK information is being carried by a UL control channel, such as the PUCCH 360. The method 500 may be implemented by the eNB 302. In one embodiment, the PUCCH may be in format 1 which has previously been used to carry only ACK/NAK information. As such, the eNB 302 should be able to differentiate whether ACK/NAK information or CQI information for persistent scheduled UEs is being carried on the PUCCH. The method 500 allows for the eNB 302 to determine whether a PUCCH in format 1 carries ACK/NAK information or CQI information.

In one embodiment, the eNB 302 determines 502 the scheduling type for the UE 304. The scheduling type may include persistent scheduling or dynamic scheduling. The eNB 302 may determine 504 the information type, such as CQI information or ACK/NAK information. In one embodiment, the eNB 302 determines 506 the format type of an uplink control channel, such the PUCCH. The format type may be based on the determined scheduling type and the determined format type. In one embodiment, the eNB determines 506 to allocate format 1 for the PUCCH. The CQI information for a persistent scheduled UE may be carried on the PUCCH in format 1.

Resources for the PUCCH may be reserved 508. The resources that are reserved 508 may be based on the scheduling type, information type and format type. In one embodiment, the reserved resources may be time, frequency, period, UE index, information type, format type, etc. The eNB 302 may inform 510 the UE of the reserved resources.

The eNB 302 and the UE 304 may exchange data and feedback information (e.g., CQI information or ACK/NAK information). The eNB 302 may receive 512 a PUCCH in a first format that includes CQI or ACK/NAK information. A determination 514 is made whether the PUCCH includes CQI information or ACK/NAK information. If the received PUCCH carries CQI information, an MCS may be applied 518 based on the received CQI information. If the received PUCCH carries ACK/NAK information, the ACK/NAK information may be used 516 for Hybrid Automatic Repeat Request (HARQ).

The UE index may be an index of code as shown in Table 5 below. By allocating a different time, frequency and UE index for each UE, the eNB 302 may treat the PUCCH resource for each UE as independent.

By implementing the methods 400, 500 described above in FIG. 4 and FIG. 5, more users may be multiplexed into one PUCCH when CQI information is transmitted. In other words, the number of VoIP users may increase. In addition, the allocation for CQI resources may be reduced during a persistent scheduling mode. Further, a new format for the PUCCH is not necessary because the reduced CQI bits may be transmitted utilizing an existing format (i.e., format 1) of the PUCCH. In other embodiments, the PUSCH may be used to transmit the CQI information from the UE 304 to the eNB 302.

As previously mentioned, a PUCCH has three types of formats as shown in the following:

TABLE 1

| PUCCH Format | Modulation Scheme | Number of bits per subframe, $M_{bit}$ | |
|---|---|---|---|
| | | Normal cyclic prefix | Extended cyclic prefix |
| 0 | BPSK | 1 | 1 |
| 1 | QPSK | 2 | 2 |
| 2 | QPSK | 20 | 20 |

As shown by Table 1, PUCCH format 0 includes a modulation scheme of binary phase shift keying (BPSK) while format 1 and format 2 include a quadrature phase shift keying (QPSK) modulation scheme. Table 1 further shows that format 0 and format 1 of the PUCCH can carry one or two bits. In previous systems, these bits have been considered to be ACK/NAK bits. Format 2 of the PUCCH may carry up to 10 bits and these bits have been considered to be CQI+ACK/NAK bits as shown in the following:

TABLE 2

| Format Type | Capacity | Contents |
|---|---|---|
| Format 0 | 1 bit | ACK/NAK |
| Format 1 | 2 bits | ACK/NACK |
| Format 2 | Up to 10 bits | CQI + ACK/NAK |

Format 0 and format 1 may allow for a different number of users to be multiplexed together than format 2. For example, format 0 and format 1 may be multiplied by 18 users at the same frequency and time, while format 2 may be multiplied by six users at the same frequency and time as illustrated in the following:

TABLE 3

| Format Type | Number of Multiplexed Users |
|---|---|
| Format 0 | Up to 18 users |
| Format 1 | Up to 18 users |
| Format 2 | Up to 6 users |

The number of multiplexed users indicated in Table 3 may the number of users multiplexed together in one subframe in one resource block (RB).

As stated previously, the present systems and methods utilize format 1 of the PUCCH to carry ACK/NAK or CQI bits for persistent scheduled UEs, while format 2 of the PUCCH may be used to carry CQI+ACK/NAK bits for dynamic scheduled UEs. This is shown by the following:

TABLE 4

| Format Type | Capacity | Contents |
|---|---|---|
| Format 0 | 1 bit | ACK/NAK |
| Format 1 | 2 bits | ACK/NAK CQI for persistent scheduling |
| Format 2 | Up to 10 bits | CQI for dynamic scheduling + ACK/NAK |

Table 5, shown below, is an example of code allocation for UL ACK/NAK. Table 5 also illustrates one embodiment of multiplexing different users (or UEs) on the same frequency and time as is done in format 0 or format 1 of the PUCCH. Elements 1-18 illustrate an index of a UE. Different UE indices have different combinations of a cyclic shift and block-wise spreading codes, as shown in the following:

TABLE 5

| Cyclic shift within a LB | Block-wise spreading code for RS | | | Block-wise spreading code for ACK/NACK data | | | |
|---|---|---|---|---|---|---|---|
| | (1, 1, 1) | (1, $e^{j2pi/3}$, $e^{j4pi/3}$) | (1, $e^{j4pi/3}$, $e^{j8pi/3}$) | (1, 1, 1, 1) | (1, 1, −1, −1) | (1, −1, −1, 1) | (1, −1, 1, −1) |
| 0 | #1 | | #13 | #1 | | #13 | |
| 1 | | #7 | | | #7 | | |
| 2 | #2 | | #14 | #2 | | #14 | |
| 3 | | #8 | | | #8 | | |
| 4 | #3 | | #15 | #3 | | #15 | |
| 5 | | #9 | | | #9 | | |
| 6 | #4 | | #16 | #4 | | #16 | |
| 7 | | #10 | | | #10 | | |
| 8 | #5 | | #17 | #5 | | #17 | |
| 9 | | #11 | | | #11 | | |
| 10 | #6 | | #18 | #6 | | #18 | |
| 11 | | #12 | | | #12 | | |

In one embodiment, the ACK/NAK part of the PUCCH uses one of six cyclic shifts within a long block (LB) and one of four block-wise spreading codes.

Figure 5A:
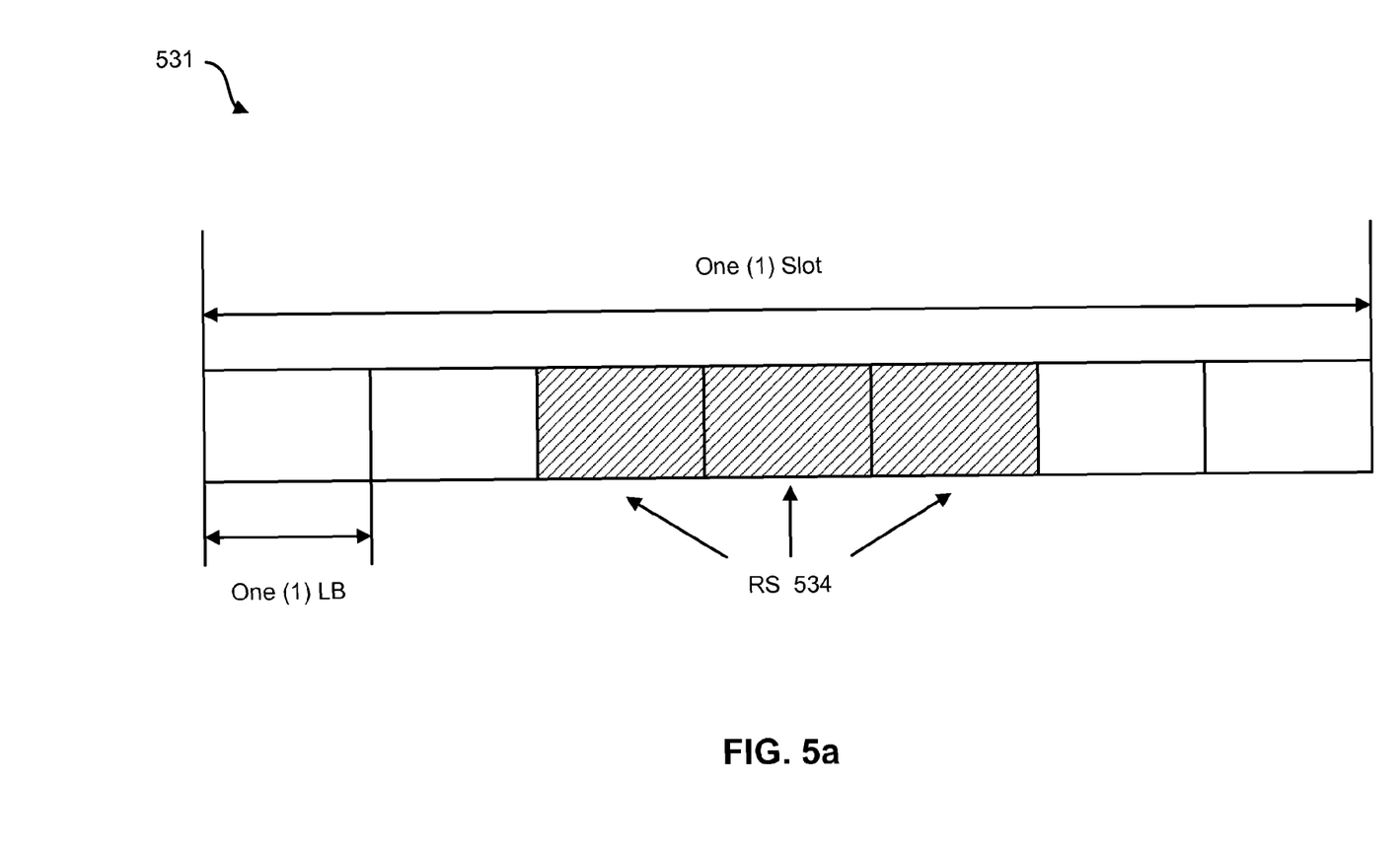
FIG. 5a is a block diagram illustrating one embodiment of a single slot in a channel.

FIG. 5a is a block diagram illustrating one embodiment of a single slot 531 in a channel. The single slot 531 may include seven LBs in the UL of LTE. In format 0 or format 1 of PUCCH, reference signals (RS) 534 may be transmitted in three LBs. Reference signals 534 may be used to estimate the channel conditions. Estimated channel conditions may be used for the demodulation of the PUCCH. However, the RS part of the PUCCH may use three orthogonal covers. As such, 18 simultaneous usages of cyclic shifts/block-wise spreading codes may be available as illustrated in Table 5. In one embodiment, no cyclic shifts/block-wise spreading codes are available for ACK/NAK data (1, −1, 1, −1).

Figure 6:
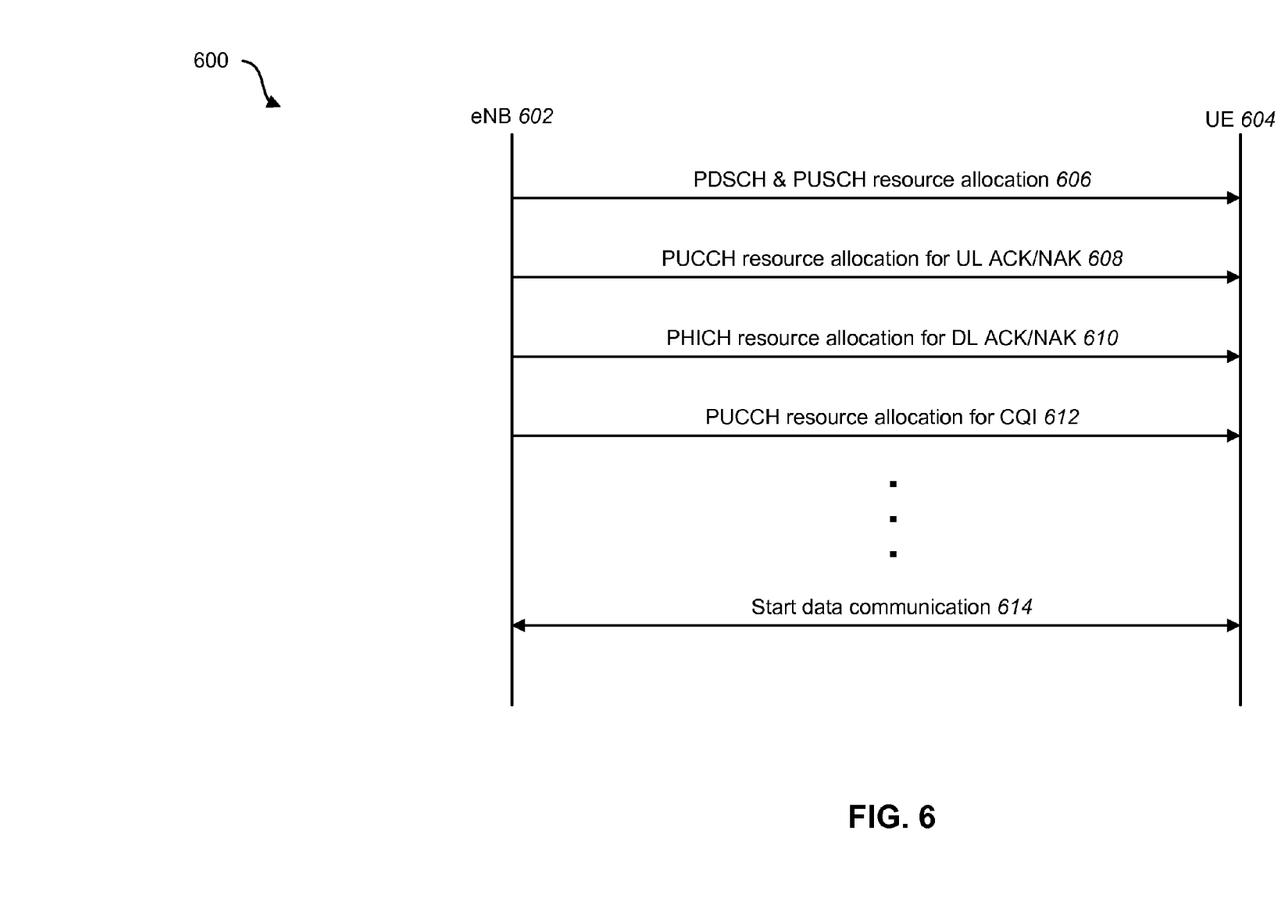
FIG. 6 is a thread diagram illustrating one embodiment of persistent scheduling communication in accordance with the present systems and methods.

FIG. 6 is a thread diagram 600 illustrating one embodiment of persistent scheduling communication in accordance with the present systems and methods. In one embodiment, before data communication is started 614, the eNB 602 informs the allocation of resources to the UE 604 via RRC signaling 344. For example, the resources for the PDSCH and the PUSCH may be allocated 606 to the UE 604. In addition, the resources for UL ACK/NAK on the PUCCH may also be allocated 608. The eNB 602 may further allocate 610 resources for DL ACK/NAK. The DL ACK/NAK may be carried on the PHICH. Further, resources may be allocated 612 for CQI information that is carried on the PUCCH. Additional resources may be allocated that are not shown in FIG. 6. Once the resources have been allocated, data communications may start 614 between the eNB 602 to the UE 604. The UE 604 may be a persistent scheduled UE.

In one embodiment, the PUCCH resource allocation 608, 612 may include the time and frequency of the PUCCH. In addition, the resource allocation 608, 612 may include the format type (i.e., format 0, format 1 or format 2) of the PUCCH. The PUCCH resource allocation 608, 612 may also include information relating to the UE index (cyclic shift and block-wise spreading codes) as provided above in Table 5. The eNB 602 and the UE 604 may know which cyclic shift and block-wise spreading codes are allocated for the UE 604 in persistent scheduling mode. In another embodiment, the eNB 602 may communicate with a dynamic scheduled UE and a persistent scheduled UE at the same time based on a configuration provided from RRC signaling 344.

As shown in FIG. 6, the eNB 602 may provide the resource allocation parameters for the PUCCH to each persistent scheduled UE. However, for dynamic scheduling, the eNB 602 may reserve a set of allocation parameters for dynamic scheduled UEs. Otherwise, resources for a dynamic scheduled UE and a persistent scheduled UE may conflict.

Figure 7:
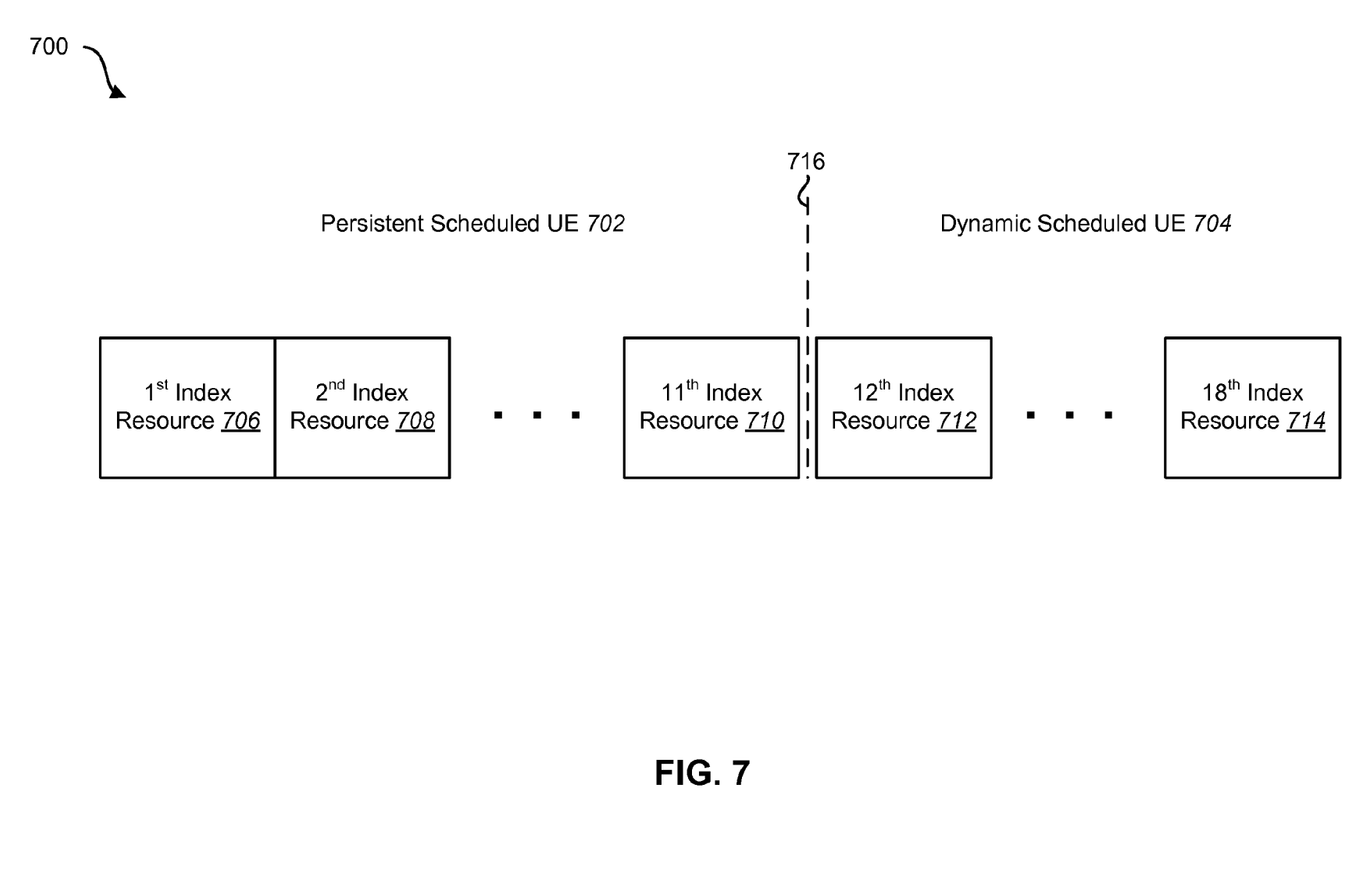
FIG. 7 illustrates one embodiment of a process of reserving resource allocations for a persistent scheduled UE and a dynamic scheduled UE.

FIG. 7 illustrates one embodiment of a process 700 of reserving resource allocations for a persistent scheduled UE 702 and a dynamic scheduled UE 704. A resource separation 716 illustrates the separate reservation of resource allocations for the UEs 702, 704. In one embodiment, for the persistent scheduled UE 702, the resources (i.e., the UE index from Table 5) for CQI information and ACK/NAK information is reserved. For example, this reservation may include a $1^{st}$ index resource 706, a $2^{nd}$ index resource 708, up to an $11^{th}$ index resource 710. For the dynamic scheduled UE 704, the resource for the ACK/NAK information may be reserved separately. These resources may include the $12^{th}$ index resource 712 up to the $18^{th}$ index resource 714.

By reserving the resources separately, a conflict is avoided for resources relating to ACK/NAK information for dynamic scheduled UEs, ACK/NAK information for persistent scheduled UEs and CQI information for persistent scheduled UEs. As previously stated, both the eNB and each UE are aware of which resources (i.e., time, frequency, cyclic shift and block-wise spreading codes) are allocated to each UE.

In some embodiments, during VoIP conversations, CQI information and ACK/NAK information for a persistent scheduled UE may be transmitted in the same subframe. However, a different UE index is allocated to the CQI information and the ACK/NAK information as previously explained. As such, there may not be a conflict of resources if the CQI information and the ACK/NAK information is transmitted in the same subframe. But, in some embodiments, the UE may be on the cell edge and the eNB may allocate more transmission power to these signals. In this embodiment, the CQI information and the ACK/NAK information may be allocated in different subframes.

The eNB scheduler 310 may allocate different subframes for CQI information and ACK/NAK information. In VoIP, the timing of persistent scheduled data (i.e., new data) and dynamic scheduled data (i.e., retransmission data) may be predetermined by the scheduler 310. As such, the eNB scheduler 310 may allocate different subframes for CQI information and ACK/NAK information that is transmitted from the same UE.

Figure 8:
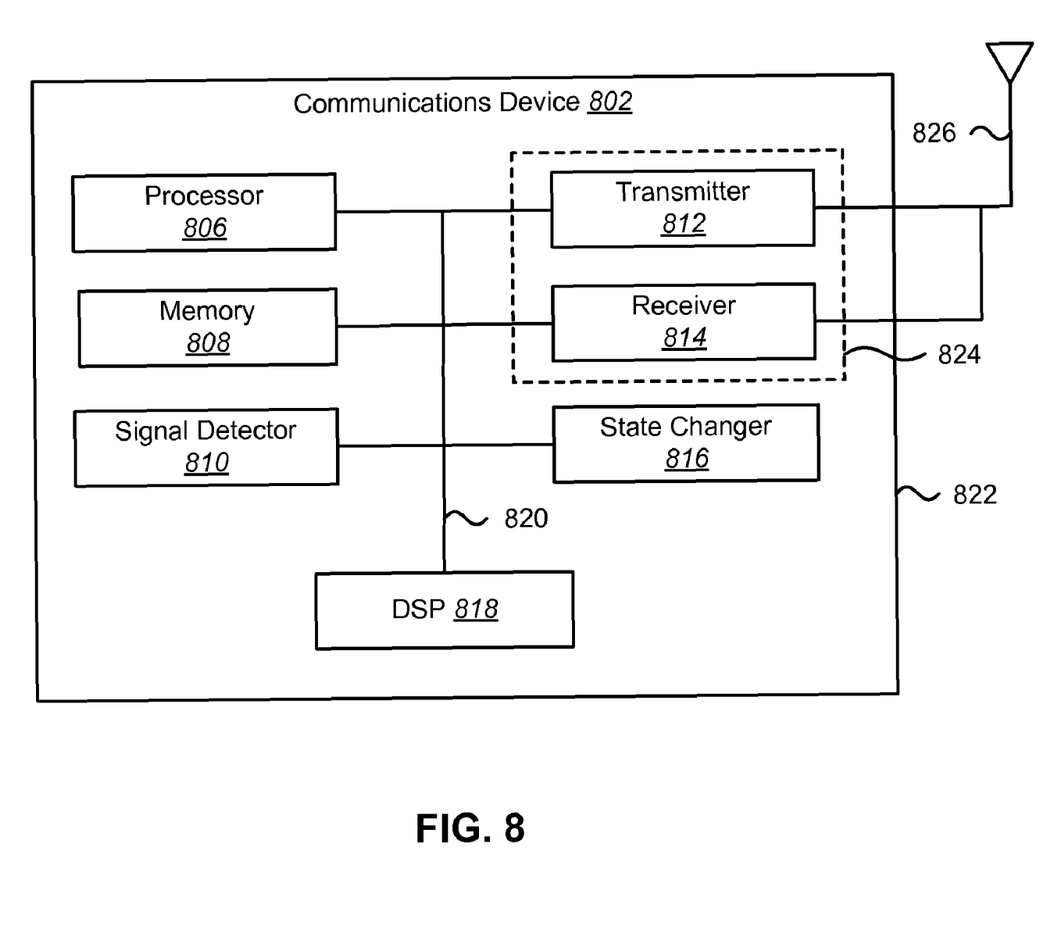
FIG. 8 illustrates various components that may be utilized in a communications device.

FIG. 8 illustrates various components that may be utilized in a communications device 802, such as a UE, in accordance with one embodiment. The device 802 includes a processor 806 which controls operation of the device 802. The processor 806 may also be referred to as a CPU.

Memory 808, which may include both read-only memory (ROM) and random access memory (RAM), provides instructions and data to the processor 806. A portion of the memory 808 may also include non-volatile random access memory (NVRAM). The memory 808 may include any electronic component capable of storing electronic information, and may be embodied as ROM, RAM, magnetic disk storage media, optical storage media, flash memory, on-board memory included with the processor 806, EPROM memory, EEPROM memory, registers, a hard disk, a removable disk, a CD-ROM, etc. The memory 808 may store program instructions and other types of data. The program instructions may be executed by the processor 806 to implement some or all of the methods disclosed herein.

The device 802 may also include a housing 822 that includes a transmitter 812 and a receiver 814 to allow transmission and reception of data between the communications device 802 and a remote location. The transmitter 812 and receiver 814 may be combined into a transceiver 824. An antenna 826 is attached to the housing 822 and electrically coupled to the transceiver 824.

The communications device 802 also includes a signal detector 810 used to detect and quantify the level of signals received by the transceiver 824. The signal detector 810 detects such signals as total energy, power spectral density and other signals.

A state changer 816 of the device 802 controls the state of the device 802 based on a current state and additional signals received by the transceiver 824 and detected by the signal detector 810. The device 802 is capable of operating in any one of a number of states.

The various components of the device 802 are coupled together by a bus system 820 which may include a power bus, a control signal bus, and a status signal bus in addition to a data bus. However, for the sake of clarity, the various busses are illustrated in FIG. 8 as the bus system 820. The device 802 may also include a digital signal processor (DSP) 818 for use in processing signals.

Figure 9:
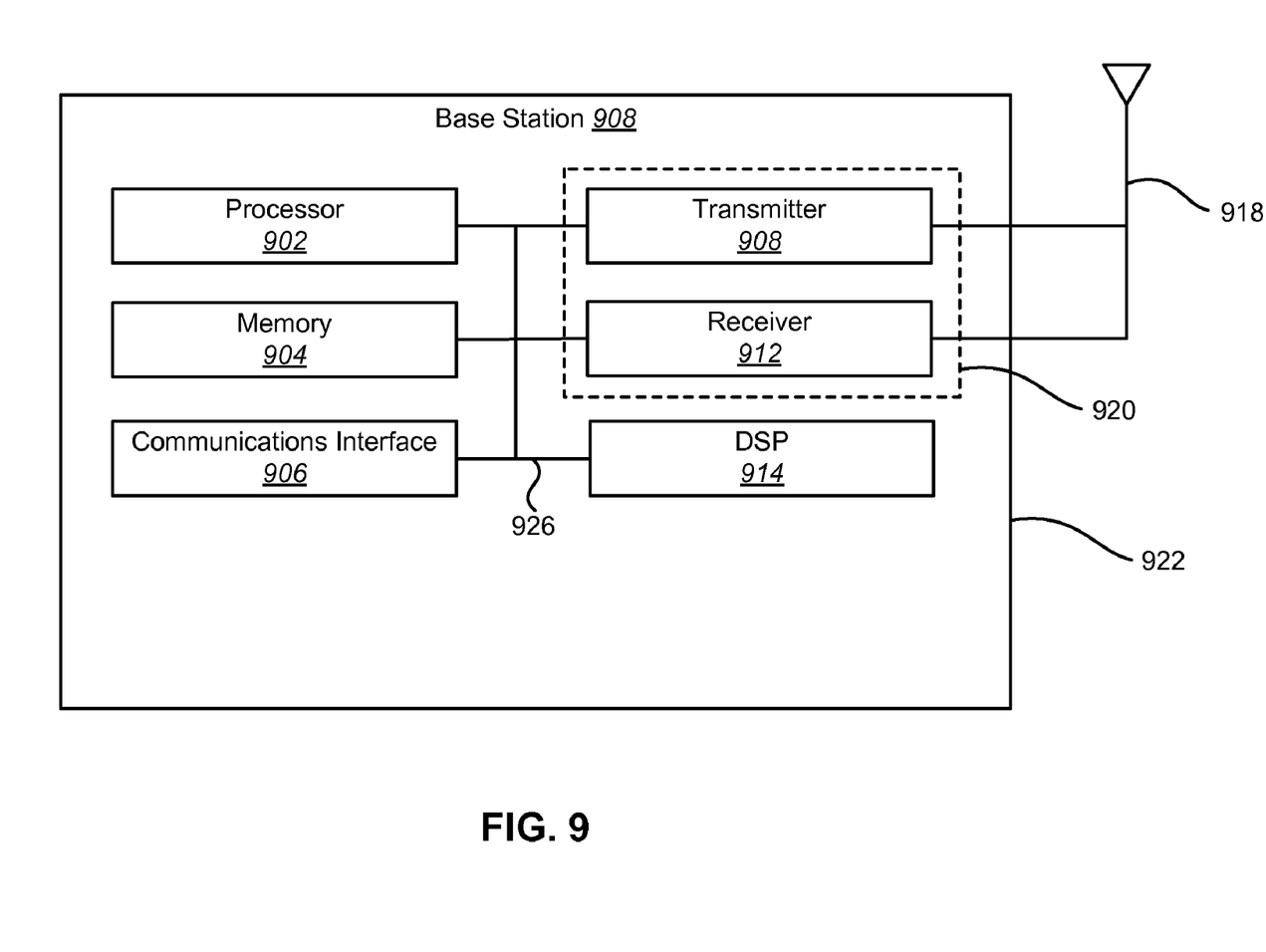
FIG. 9 illustrates various components that may be utilized in a base station.

FIG. 9 is a block diagram of a base station 908 in accordance with one embodiment of the disclosed systems and methods. The base station 908 may be an eNB, a base station controller, a base station transceiver, etc. The base station 908 includes a transceiver 920 that includes a transmitter 910 and a receiver 912. The transceiver 920 may be coupled to an antenna 918. The base station 908 further includes a digital signal processor (DSP) 914, a general purpose processor 902, memory 904, and a communication interface 906. The various components of the base station 908 may be included within a housing 922.

The processor 902 may control operation of the base station 908. The processor 902 may also be referred to as a CPU. The memory 904, which may include both read-only memory (ROM) and random access memory (RAM), provides instructions and data to the processor 902. A portion of the memory 904 may also include non-volatile random access memory (NVRAM). The memory 904 may include any electronic component capable of storing electronic information, and may be embodied as ROM, RAM, magnetic disk storage media, optical storage media, flash memory, on-board memory included with the processor 902, EPROM memory, EEPROM memory, registers, a hard disk, a removable disk, a CD-ROM, etc. The memory 904 may store program instructions and other types of data. The program instructions may be executed by the processor 902 to implement some or all of the methods disclosed herein.

In accordance with the disclosed systems and methods, the antenna 918 may receive reverse link signals that have been transmitted from a nearby communications device 802, such as a UE. The antenna 918 provides these received signals to the transceiver 920 which filters and amplifies the signals. The signals are provided from the transceiver 920 to the DSP 914 and to the general purpose processor 902 for demodulation, decoding, further filtering, etc.

The various components of the base station 908 are coupled together by a bus system 926 which may include a power bus, a control signal bus, and a status signal bus in addition to a data bus. However, for the sake of clarity, the various busses are illustrated in FIG. 9 as the bus system 926.

The present systems and methods described herein relate to 3GPP LTE systems. However, the present systems and methods may be utilized for other OFDM communication systems, for example IEEE 802.16m.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the embodiments disclosed herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

While specific embodiments have been illustrated and described, it is to be understood that the claims are not limited to the precise configuration and components illustrated above. Various modifications, changes and variations may be made in the arrangement, operation and details of the embodiments described above without departing from the scope of the claims.

What is claimed is:

1. A method for using a format of an uplink control channel to transmit a channel quality indicator (CQI), comprising:
providing the uplink control channel in a first format, wherein the uplink control channel in the first format allocates two bits of information to carry and only carry persistently scheduled CQI and acknowledgment/non-acknowledgment (ACK/NAK) information, wherein no other bits of information within the first format are allocated to carry any portion of the persistently scheduled CQI and the ACK/NAK information;
inserting the CQI or the ACK/NAK information into the uplink control channel; and
transmitting either the CQI or the ACK/NAK information through the uplink control channel.

2. The method of claim 1, wherein the uplink control channel is a Physical Uplink Control Channel (PUCCH).

3. The method of claim 1, wherein the CQI comprises two bits.

4. The method of claim 1, further comprising receiving resource allocations for the uplink control channel.

5. The method of claim 1, wherein the method is implemented by mobile user equipment (UE), wherein the UE is a persistent scheduled UE.

6. The method of claim 1, wherein the uplink control channel is a Physical Uplink Shared Control Channel (PUSCH).

7. The method of claim 6, further comprising providing the uplink control channel in a second format for the CQI if mobile user equipment (UE) is a dynamically scheduled UE.

8. A communications device that is configured to use a format of an uplink control channel to transmit a channel quality indicator (CQI), the communications device comprising:
a processor;
memory in electronic communication with the processor;
instructions stored in the memory, the instructions being executable to:
provide the uplink control channel in a first format, wherein the uplink control channel in the first format allocates two bits of information to carry and only carry persistently scheduled CQI and acknowledgment/non-acknowledgment (ACK/NAK) information, wherein no other bits of information within the first format are allocated to carry any portion of the persistently scheduled CQI and the ACK/NAK information;
insert the CQI or the ACK/NAK information into the uplink control channel; and
transmit either the CQI or the ACK/NAK information through the uplink control channel.

9. The communications device of claim 8, wherein the uplink control channel is a Physical Uplink Control Channel (PUCCH).

10. The communications device of claim 8, wherein the uplink control channel in the first format carries two bits of information.

11. The communications device of claim 8, wherein the instructions are further executable to receive resource allocations for the uplink control channel.

12. The communications device of claim 8, wherein the communications device is a persistent scheduled device.

13. The communications device of claim 8, wherein the uplink control channel is a Physical Uplink Shared Control Channel (PUSCH).

14. The communications device of claim 8, wherein the instructions are further executable to provide the uplink control channel in a second format for the CQI if the communications device is a dynamically scheduled device.

15. A non-transitory computer-readable medium comprising executable instructions for:
providing an uplink control channel in a first format, wherein the uplink control channel in the first format allocates two bits of information to carry and only carry persistently scheduled channel quality indicator (CQI) and acknowledgment/non-acknowledgment (ACK/NAK) information, wherein no other bits of information within the first format are allocated to carry any portion of the persistently scheduled CQI and the ACK/NAK information;
inserting the CQI or the ACK/NAK information into the uplink control channel; and
transmitting either the CQI or the ACK/NAK information through the uplink control channel.

* * * * *